Figure 7:
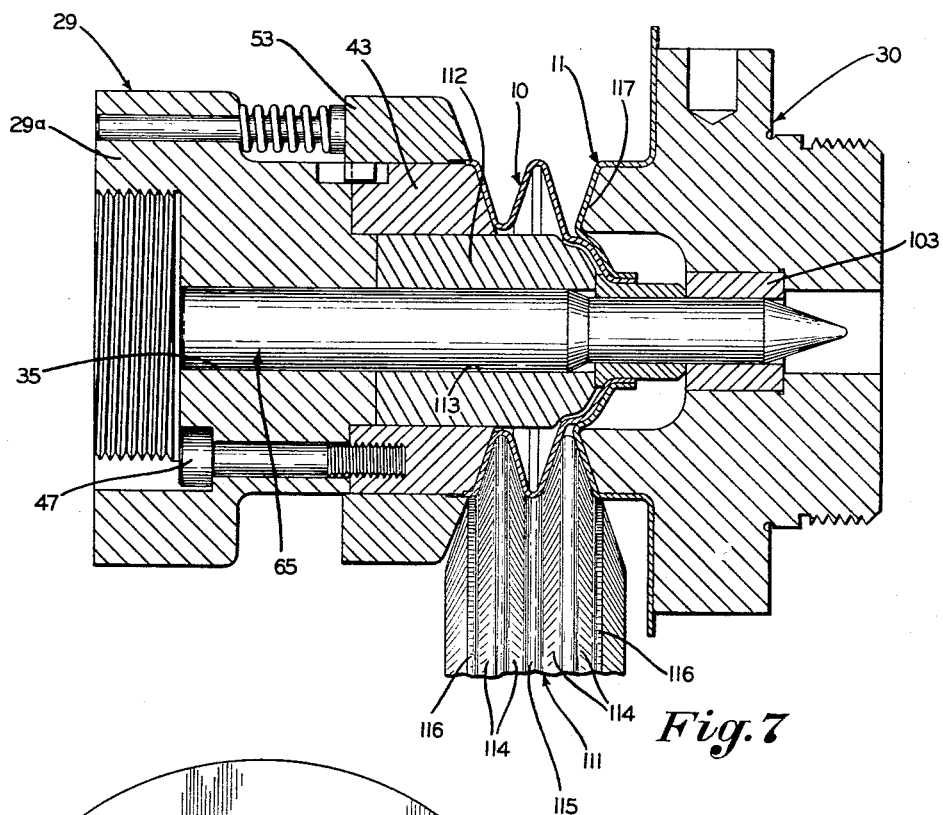

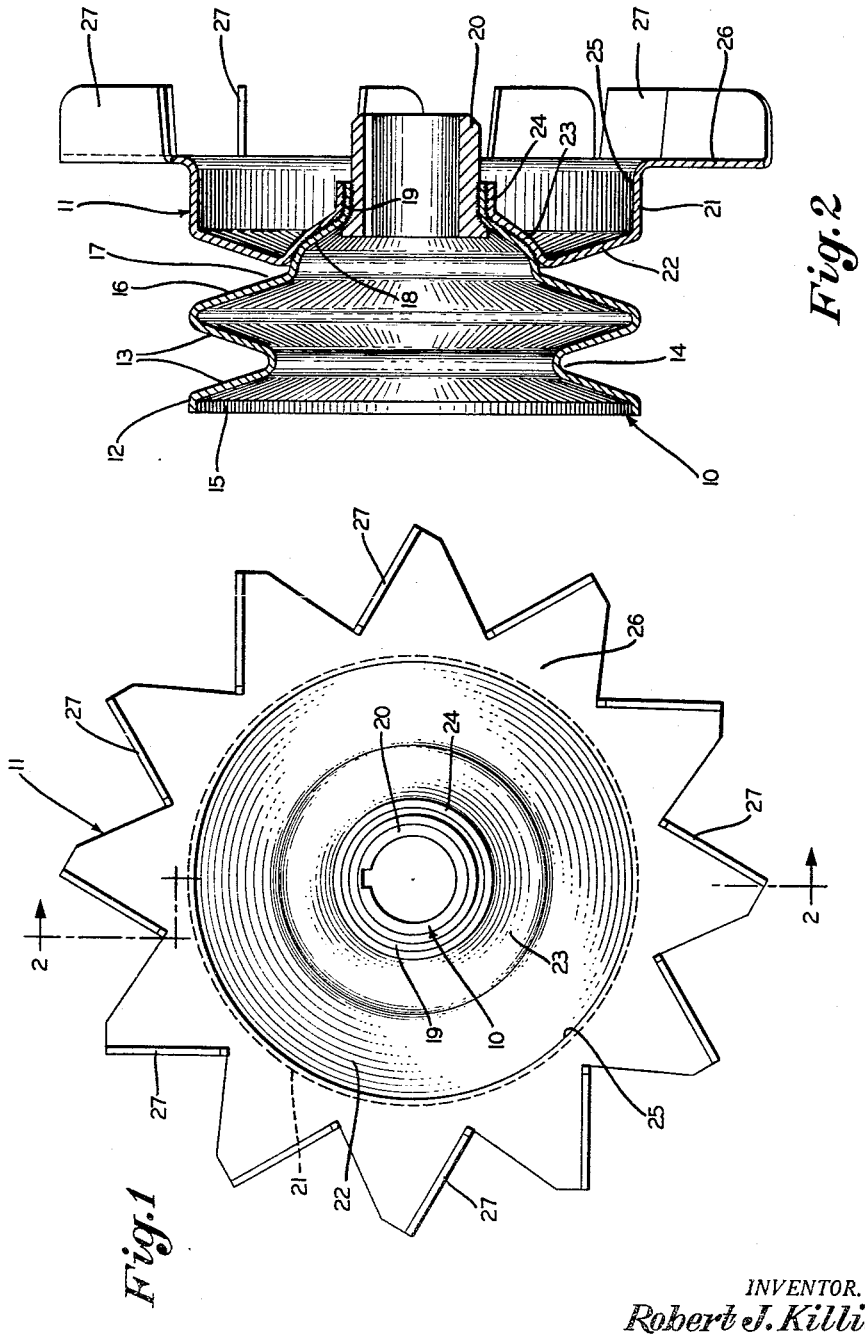

Oct. 11, 1960     R. J. KILLIAN     2,955,748
MULTI-GROOVE PULLEY MANUFACTURE
Filed Jan. 9, 1956     3 Sheets-Sheet 2
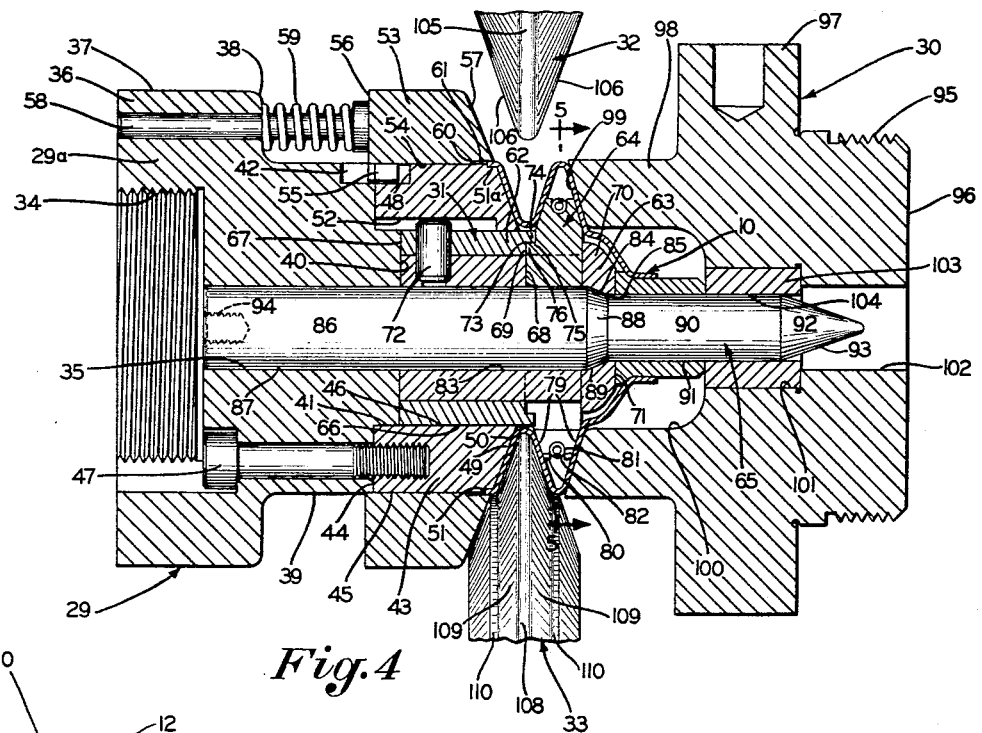
*Fig. 4*
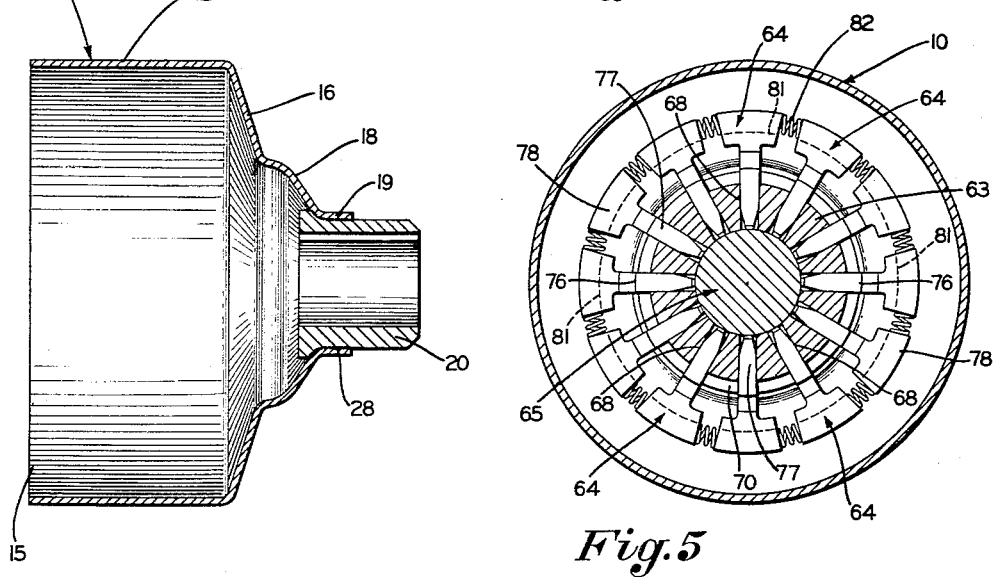
*Fig. 3*     *Fig. 5*
INVENTOR.
Robert J. Killian
BY Frease & Bishop
ATTORNEYS Oct. 11, 1960 R. J. KILLIAN 2,955,748
MULTI-GROOVE PULLEY MANUFACTURE
Filed Jan. 9, 1956 3 Sheets-Sheet 3

INVENTOR.
Robert J. Killian
BY Frease & Bishop
ATTORNEYS

United States Patent Office 2,955,748
Patented Oct. 11, 1960

2,955,748

MULTI-GROOVE PULLEY MANUFACTURE

Robert J. Killian, Canton, Ohio, assignor to Automatic Steel Products, Inc., Canton, Ohio, a corporation of Delaware Filed Jan. 9, 1956, Ser. No. 558,032

5 Claims. (Cl. 230—135)

My invention relates to a multi-groove pulley construction and more specifically, to pulleys having a series of two or more parallel V-shaped grooves formed therein. Even more specifically, my invention relates to pulleys formed from at least two pieces with one piece forming a side wall of a first groove, and the second piece forming the other side wall of the first groove and also further forming the side walls of complete grooves positioned adjacent and parallel one another and parallel to the first groove. Finally, the piece forming the one side wall of the first groove preferably has a supplementary unit formed thereon, such as a circulating fan or dust shield.

The present improvements in multi-groove pulley manufacture in part constitute improvements upon the methods and apparatus set forth in the Nelson Patent No. 1,680,061, the Harrison Patents Nos. 1,828,464 and 2,062,415, the Wickwire et al. Patent No. 2,685,856 and the Killian et al. patent applications, Serial No. 488,870, now Patent No. 2,892,431 and Serial No. 497,880, now Patent No. 2,869,223.

Pulleys of this general character having a circulating fan formed as the supplementary unit thereon are frequently used for driving and maintaining a circulation of air through generators of motor vehicles. Formerly, the pulley driving and cooling these motor vehicle generators has been formed with merely a single V-groove. In recent years, however, with the advent of the higher speed and higher horsepower motor vehicle engines, and the increased number of accessories on the motor vehicle requiring electrical energy, it has become necessary to provide a multi-groove pulley or one having at least two parallel V-shaped grooves formed thereon. A further important factor is that the generators and thus the pulleys driving the generators are being rotated at an extremely high rate of speed by the modern high speed engines, such speeds ranging in the order of six to twelve thousand revolutions per minute, so that balance of the pulley becomes a major factor.

One prior construction of multi-groove pulleys for driving and cooling generators has been formed in one piece from cast iron. A major difficulty with such a construction is that the V-grooves must be very closely machined therein, resulting in a high production cost per piece. A further difficulty is that a cast iron pulley is necessarily heavy, requiring stronger shafts on the generator upon which the pulley is mounted and presenting a greater balance problem, since a slight out of balance of such a heavy part may seriously damage the bearings in the generator.

A further prior construction of multi-groove pulleys has been formed from a series of pieces brazed or spot welded together to form an assembled pulley having the series of V-shaped grooves. In this construction, however, all of the various pieces are press formed, and every groove in the finished pulley is formed from two pieces, so that an extreme problem of out of balance in the assembled pulley is encountered. This is true even though the various parts may be precision formed, since it is difficult to assemble the numerous parts so that each groove is perfectly concentric with the other grooves and the center bore of the pulley.

It is therefore a general object of the present invention to provide a multi-groove pulley construction which overcomes the above stated difficulties and disadvantages of the prior constructions.

It is a primary object of the present invention to provide a multi-groove pulley construction in which at least one of the grooves has the walls thereof formed of two separate pieces yet all of the groove walls have a high degree of concentricity and balance in the finished pulley.

It is a further object of the present invention to provide a multi-groove pulley construction in which at least one of the grooves has the walls thereof formed of two pieces, yet all of the walls of all of the grooves are provided with long wearing roller work-hardened surfaces.

It is still a further object of the present invention to provide a multi-groove pulley construction which is relatively light in weight and is satisfactory for high speed application.

It is another object of the present invention to provide a multi-groove pulley construction in which a supplementary unit such as a fan or dust shield may be formed as an integral part of one of the walls of one of the grooves.

Finally, it is an object of the present invention to provide a multi-groove pulley construction which satisfies all of the above objects, but yet may be manufactured with a minimum of operations and at a minimum of cost.

These and other objects are accomplished by the parts, constructions, arrangements, combinations, sub-combinations, methods and procedures comprising the present invention the nature of which are set forth in the following general statements, preferred embodiments of which—illustrative of the best mode of which applicant has contemplated applying the principles—are set forth in the following description and illustrated in the accompanying drawing, and which are particularly and distinctly pointed out and set forth in the appended claims forming a part hereof.

In general terms, the multi-groove pulley construction comprising the present invention may be stated as including an annular first piece having at least one annular V-shaped groove formed therein. The first piece extends angularly inwardly adjacent the one groove, forming one side wall of a second annular V-shaped groove, and then terminates inwardly of the one side wall in a fastening portion.

The pulley construction further includes an annular second piece having an annular angled portion and positioned so that the angled portion forms the other side wall of the second V-shaped groove. The second piece also terminates inwardly in a fastening portion and is positioned with this fastening portion telescoped over and secured to the first piece fastening portion.

The second piece preferably terminates outwardly in a flange portion and a supplementary unit, such as a fan or dust shield is formed on this flange portion. Finally, the first and second piece fastening portions are preferably mounted on and secured to a hub member.

In general terms, the method of forming the multi-groove pulley construction comprising the present invention includes the steps of forming a cup-shaped blank having an annular axially extending flange portion and an annular inwardly angled portion, preferably securing the blank telescoped over a hub member, roller forming at least one V-shaped groove in the blank axially extending flange portion, and preferably supporting the blank inwardly angled portion while said one groove is being formed.

The method further includes forming a second piece having an inwardly angled portion and preferably an outwardly extending flange portion, and securing the second piece telescoped over the hub and blank with the inwardly angled portions of the second piece and the blank forming the side walls of a V-shaped groove. Finally, the method preferably includes simultaneously roller ironing all of the V-shaped grooves, and forming a supplementary unit, such as a fan or dust shield in the second piece outwardly extending flange portion.

Figure 6:
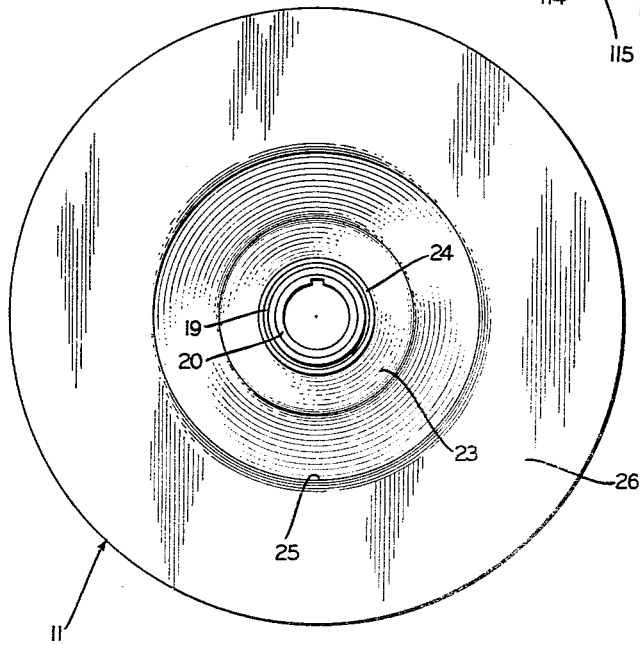

By way of example, an embodiment of the multi-groove pulley construction comprising the present invention and certain of the equipment for forming the same, are illustrated in the accompanying drawings forming a part hereof wherein like numerals indicate similar parts throughout the several views and in which:

Fig. 1 is an end view of the assembled multi-groove pulley construction comprising the present invention;

Fig. 2, a vertical section looking in the direction of the arrows 2—2 in Fig. 1;

Fig. 3, an axial vertical section of the cup-shaped blank which forms the side walls of one complete groove and one side wall of a second groove, said cup-shaped blank being secured telescoped over a hub member;

Fig. 4, a top fragmentary view of the spinning rolls and an axial horizontal section of the spinning forms for forming the complete V-shaped groove in the cup-shaped blank of Fig. 3, showing the cup-shaped blank mounted thereon and the roller forming of the complete V-shaped groove being performed;

Fig. 5, a sectional view, looking in the direction of the arrows 5—5 in Fig. 4;

Fig. 6, an end view of the second piece forming the other side wall of the second groove of the pulley construction comprising the present invention; and Fig. 7, a top fragmentary view of the spinning rolls and an axial horizontal section, part in elevation, of the spinning forms for reforming and roller work-hardening the surfaces of the parallel grooves formed in the assembled pulley construction, showing the two pieces of the pulley construction assembled and mounted on the spinning forms.

The multi-groove pulley construction comprising the present invention is illustrated in Figs. 1 and 2 and includes a generally cup-shaped first member, generally indicated at 10 and an annular second member, generally indicated at 11. Members 10 and 11 are preferably formed from relatively thin sheet or strip steel, in the order of 14 to 18 gauge. Further, members 10 and 11 may be formed in any usual manner, but are preferably formed according to the method to be hereinafter described.

Member 10 includes an axially extending flange 12, which flange forms the walls 13 of at least one generally V-shaped groove 14, and terminates in an open end 15. It is obvious that more than one V-shaped groove 14 may be formed in the flange 12 and it is not intended to limit the present invention to merely the single V-shaped groove shown being formed in member 10.

Flange 12 terminates inwardly of groove 14 in an annular inwardly angled generally flat portion 16. Portion 16 angles inwardly in a direction away from the groove 14, so that portion 16 may ultimately form one of the side walls of a second generally V-shaped groove 17.

Portion 16 terminates inwardly in a fastening portion 18. Fastening portion 18 may be formed in numerous configurations, some of which are shown in the Nelson Patent No. 1,680,061, such as, with bolt holes for fastening to a hub or the like. As shown in Fig. 2, fastening portion 18 may also be formed with a necked portion 19 for mounting on a hub 20.

The second member 11 includes an outer flange portion 21, an inwardly angled portion 22 and a fastening portion 23. Inwardly angled portion 22 is positioned adjacent the inwardly angled portion 16 of the first member 10 and angles inwardly toward angled portion 16. Thus, angled portion 22 forms the second wall of the V-shaped groove 17.

Fastening portion 23 is integrally connected to angled portion 22 and extends inwardly in the general configuration of the fastening portion 18 of the first member 10, thereby, in the embodiment shown in Fig. 2, having the necked portion 24. The second member 11 is mounted on the first member 10, with angled portion 20 positioned as above described, and with the fastening portion 23 abutting the fastening portion 18.

In the particular embodiment shown in Figs. 1 and 2, fastening portions 23 and 18 are formed with necked portions 24 and 19, respectively, and are telescoped over a hub 20. Further, the fastening portions 23 and 18 and necked portions 24 and 19 are preferably brazed together and brazed to the hub 20 in a usual manner. This brazing could, however, be replaced by other fastening means, such as spot welding or the like.

The outer flange portion 21 of the second member 11 is integrally connected to the angled portion 22 and extends outwardly therefrom. In the particular embodiment shown, flange portion 21 extends from angled portion 22 in an axially extending portion 25 and then radially outwardly in a radial portion 26.

Further, flange portion 21 may have an auxiliary unit formed therein or connected thereto, such as a fan or dust shield. In the particular embodiment shown, the vanes 27 of a fan may be formed in the radial portion 26, as shown. It should be understood that flange portion 21 may be formed in other configurations and may be provided with other types of auxiliary units and that it is not intended to limit the principles of the present invention to the particular auxiliary unit shown.

The multi-groove pulley construction comprising the present invention may be formed with the equipment and according to the methods and procedures illustrated in Figs. 3 through 7. Although the pulley construction illustrated in Figs. 1 and 2 may be formed by other methods such as totally by press-forming and machining, it is preferred that this construction be formed according to the methods and procedures hereinafter described, so that the walls 13 of V-groove 14 and walls 16 and 22 of V-groove 17 will be roller worked, thereby providing smooth roller work-hardened surfaces defining the V-grooves 14 and 17.

According to the method comprising the present invention, the generally cup-shaped first member 10 is first formed by usual methods, such as press-forming, so that as illustrated in Fig. 3, it has merely the axially extending flange 12, inwardly angled portion 16, fastening portion 18 and preferably the necked portion 19. The open end 15 is trimmed by any usual means, such as rotary trimming, so that the axially extending flange 12 is of substantially uniform axial length throughout its circumference.

Member 10 is preferably then telescoped over the hub 20, and is brazed thereon, such as shown at 28. Member 10 is then ready to have the V-shaped groove 14 formed in the axially extending flange 12 thereof, and the apparatus for performing this operation is illustrated in Figs. 4 and 5.

As seen in horizontal cross section in Fig. 4, the apparatus for forming the V-shaped groove 14 in member 10 includes a headstock die, generally indicated at 29, a tailstock die, generally indicated at 30, a collapsible mandrel assembly, generally indicated at 31, a roughing roll, generally indicated at 32 and a finishing roll, generally indicated at 33. This apparatus, generally indicated at 29 through 33, is mounted on a spinning machine (not shown) of any standard and usual type, such as illustrated, described or referred to in the Nelson Patent No. 1,680,061, the Harrison Patents, Nos. 1,828,464 and 2,062,415, the Wickwire et al. Patent No.

2,685,856 and the Killian et al. patent applications, Serial Nos. 488,870 and 497,880, with the headstock die 29 being mounted on the headstock spindle for rotation therewith, the tailstock die 30 being rotatably mounted on the tailstock spindle and the roughing and finishing rolls 32 and 33 rotatably mounted with the axes thereof movable toward and away from the axes on the headstock and tailstock dies 29 and 30.

Referring to Fig. 4, the headstock die 29 includes a main body portion 29a which is provided with an axial large diameter threaded bore 34 and a small diameter bore 35, as shown. Portion 29 is also provided with a radially extending flange portion 36 providing the large diameter outer peripheral surface 37, the shoulder 38 and the small diameter outer peripheral surface 39.

The inner end 40 of body portion 29a is formed with an annular shoulder 41 at a point spaced outwardly from bore 35 and inwardly from peripheral surface 39. Also end 40 of portion 29a is provided with a series of circumferentially spaced notches 42 extending radially inwardly from the outer peripheral surface 39 and axially from end 40 for a purpose to be hereinafter described.

The large diameter threaded bore 34 of main body portion 29a is threadably received on the headstock spindle in the usual manner. Further, the small diameter bore 35 thereof receives a portion of the collapsible mandrel assembly generally indicated at 31, as will be hereinafter described.

Headstock die ring member 43 is mounted with the outer end 44 thereof abutting a portion of the inner end 40 of body portion 29a. End 44 of ring member 43 is engaged telescoped over shoulder 41 of body portion 29a and extends from shoulder 41 outwardly to the small diameter outer peripheral surface 39 of body portion 29a.

Ring member 43 is provided with a generally axially extending outer peripheral surface 45 and a generally axially extending inner peripheral surface 46, and this ring member is retained engaged with body portion 29a preferably by means of a series of circumferentially spaced bolts 47 received through body portion 29a within bore 34 and threadably engaged in ring member 43, as shown. The outer peripheral surface 45 of ring member 43 is provided with a series of circumferentially spaced notches 48, which notches are in axial alignment with the notches 42 of body portion 29a when ring member 43 is mounted on portion 29a.

The inner end 49 of ring member 43, that is the end thereof facing tailstock die 30, is provided with an inwardly angled annular groove-forming surface 50, which surface angles inwardly away from body portion 29a. An annular shoulder 51 is formed in the outer peripheral surface 45 of member 43 forming the recess 51a extending from the outer end of the groove-forming surface 50 axially toward body portion 29a, and a slot 52 is formed in the inner peripheral surface 46 of member 43 extending from a point spaced from groove-forming surface 50 to the outer end 44 of member 43. Both the recess 51a and slot 52 are provided for a purpose to be hereinafter described.

Ring member 53 is mounted telescoped over ring member 43 and a portion of main body portion 29a, so that the inner peripheral surface 54 of member 53 is slideable along the outer peripheral surface 45 of ring member 43 and the small diameter outer peripheral surface 39 of body portion 29a. A series of circumferentially spaced projections or lugs 55 are formed on the inner peripheral surface 54 of ring member 53 and extend into the slots formed by the aligned notches 42 and 48 formed in the body portion 29a and ring member 43, respectively. Thus, lugs 55 limit the axial sliding movement of ring member 53 in reference to ring member 43 and body portion 29a.

Ring member 53 is further provided with a radially extending outer end surface 56 and an angling inner end surface 57. A series of circumferentially spaced pins 58 are slideably received through flange portion 36 of body portion 29a and extend to and abut the outer end surface 56 of ring member 53. Compression springs 59 are mounted surrounding pins 58 and urging these pins in a direction toward tailstock 30, thereby resiliently urging ring member 53 in a direction toward tailstock 30, within the limits of the slots formed by the notches 42 and 48 above described.

The inner peripheral surface 54 of ring member 53 is provided with an annular shoulder 60 forming a recess 61 extending from the angled groove-forming surface 50 of member 43 to a point spaced from lugs 55. Thus, an annular recess is formed between the ring member 43 and 53 defined by the recesses 51a and 61, for a purpose to be hereinafter described.

Further, ring member 53 is normally urged by pins 58 and springs 59 to a position such that the inner peripheral surface 54 of member 53 overlies the outer end of ring member 43 and a portion of the annular groove-forming surface 50 formed on member 43. The construction of ring member 53 is similar to and is for the same purpose as the construction defined and claimed in the Wickwire et al. Patent No. 2,685,856.

The collapsible mandrel assembly, generally indicated at 31, preferably includes an outer ring member 62, a main supporting member 63, a series of circumferentially spaced groove wall supporting segments 64 and an axially movable pilot pin 65. This collapsible mandrel 31 is of the same general character as the collapsible mandrels disclosed in the Killian et al. patent application, Serial Nos. 488,870 now Patent No. 2,891,431 and 497,880 now Patent No. 2,869,223 and performs the similar function of supporting the underside of the groove walls formed by the axially extending flange 12, while the desired groove or grooves are being formed therein.

Outer ring member 62 is telescoped slideably within the ring member 43 of headstock die 29, and extends outwardly or toward the tailstock die 30 a distance from the inner end of groove-forming surface 50 of ring member 43. Thus, the outer peripheral surface 66 of ring member 62 abuts and is slideable in reference to inner peripheral surface 46 of ring member 43, and the outer end 67 of ring member 62 is movable toward and away from the inner end 40 of pilot portion 29a.

Main supporting member 63 is telescoped within outer ring member 62 and is provided with a series of circumferentially spaced radially extending slots 68 formed inward of, or in a direction toward tailstock 30, from the inner end 69 of outer ring member 62. Inward of slots 68, or in a direction toward tailstock 30, supporting member 63 is formed with a radially outwardly extending flange portion 70 extending to the inner end 71 of member 63.

Pin 72 is received radially through supporting member 63 and outer ring member 62 and extends a distance radially outwardly from the outer peripheral surface 66 of ring member 62 within the confines of the slot 52 formed in the ring member 43. Thus, outer ring member 62 and main supporting member 63 are retained in fixed relation to each other, with both of these members being slideable as a unit within ring member 43 and within the limits of slot 52. Slot 52 and pin 72 thereby limit the slideable movement of members 62 and 63 in reference to the headstock die 29.

The inner end 69 of outer ring member 62 is formed with an annular shoulder 73 providing the annular projection 74. The supporting segments 64 are slideably mounted one in each of the slots 68 of supporting member 63, with these segments also being provided with a shoulder 75 forming projection 76. The segments are positioned such that the projections 76 thereof are engaged beneath or radially inwardly of the projections 74 of outer ring member 62, thereby limiting the movement of the segments 64 sliding radially outwardly of the slots 68 in the main supporting member 63.

Supporting segments 64, as best seen in Fig. 5, each include a guide portion 77 and a groove wall supporting portion 78. The guide portions 77 are received slideably in the slots 68 formed in the main supporting member 63, as shown, so that these segments are movable between positions in which the projections 76 thereof are spaced radially inwardly from the projections 74 formed on the outer ring member 62 and positions in which the projections 74 and 76 are in abutting relation preventing the segments from moving a greater distance radially outwardly.

Each of the groove wall supporting portions 78 of the supporting segments 64 is provided with angularly opposed tapered side surfaces 79 and an outer arcuate surface 80 having a spring groove 81 formed therein. A garter spring 82 is mounted received in the spring grooves 81 of segments 64, thereby circumferentially surrounding the segments and normally resiliently urging the segments radially inwardly.

Main supporting member 63 is provided with a centrally located axially extending bore 83 formed therethrough in alignment with the small diameter bore 35 in main body portion 29a. The walls defining bore 83 in supporting member 63 taper inwardly at a point spaced from the inner end of member 63 forming the angled bore 84 which terminates in a reduced diameter bore 85 extending to the inner end 71 of member 63.

Pilot pin 65 is slidably received in bore 35 of main body portion 29a and bores 83, 84 and 85 of supporting member 63. Pilot pin 65 includes the large diameter portion 86 having the outer peripheral surface 87, the angled portion 88, having the angled surface 89, the reduced diameter portion 90, having the outer peripheral surface 91 and the conical end portion 92, having the conical surface 93.

Pilot pin 65 is provided at its end toward the headstock spindle (not shown), with a short threaded bore 94, as seen in dotted lines in Fig. 4, for connecting the same to control means (not shown) incorporated in the headstock spindle, such as the construction shown in the Killian et al. patent application, Serial No. 488,870. Thus, pilot pin 65 may be moved axially in a direction toward the headstock spindle (not shown) until no portion of pin 65 underlies the guide portion 77 of supporting segments 64, or may be moved to a position in which the large diameter outer peripheral surface 87 thereof underlies and supports the guide portion 77 of segments 64, that is, the position shown in Fig. 4.

When pilot pin 65 is in the position shown in Fig. 4, such that it supports the segments 64 in their maximum radially outwardly extended position, the angled surface 89 of pilot pin abuts the walls of the angled bore 84 of supporting member 63. Also, when pin 65 is in this position, the greater portion of the reduced diameter portion 90 and conical end portion 92 of pin 65 extend toward tailstock die 30 beyond headstock die 29 and the remainder of the collapsible mandrel assembly 31, for a purpose to be hereinafter described. Further, when the pilot pin 65 is retracted toward the tailstock spindle so that no portion of this pin underlies the segments 64, the spring 82 urges segments 64 inwardly, until the guide portions 77 of these segments abut one another and the arcuate outer surface 80 of the segments are substantially axially aligned with or radially inwardly of the outer peripheral surface 66 of outer ring member 62.

The tailstock die, generally indicated at 30, is mounted on the spinning machine tailstock spindle (not shown) in axial alignment with the headstock die 29 by means of the threaded portion 95. Threaded portion 95 extends from the outer end 96 of tailstock die 30 inwardly, that is, from the end of die 30 toward the tailstock spindle (not shown) toward the headstock die 29.

Tailstock die 30 is formed with a radially outwardly extending flange portion 97 spaced axially inwardly from threaded portion 95, which flange portion terminates axially inwardly in a reduced diameter portion 98. Reduced diameter portion 98 terminates axially inwardly in an annular angled radial end surface 99, with surface 99 angling radially in a direction away from headstock die 29 and substantially parallel to the groove-forming surface 50 on ring member 43 and the support surfaces 79 of supporting segments 64 adjacent surface 99.

Angled surface 99 extends radially toward the axis of die 30 and terminates in a large diameter centrally located and axially extending bore 100, which bore extends from angled surface 99 axially outwardly to a point intermediate the length of tailstock die 30. Bore 100 terminates axially outwardly in an intermediate diameter bore 101 which extends from bore 100 to a point spaced axially inwardly from the outer end 96 of tailstock die 30. Small diameter bore 102 extends from intermediate bore 100 to the outer end 96 of die 30.

A generally hollow cylindrical insert 103 is mounted within intermediate bore 102, with the cylindrical bore 104 thereof being in axial alignment with pilot pin 65. Thus, when the pilot pin 65 is in its extended position, as illustrated in Fig. 4, a portion of the reduced diameter portion 90 and the conical portion 92 may be received within the bore 104 of insert 103, maintaining the proper centering between headstock die 29 and tailstock die 30 and for other purposes to be hereinafter described.

The roughing roll 32 and finishing roll 33 are of usual construction, with the roughing roll 32 including a rounded nose surface 105, the angled groove-forming surfaces 106 and the angled side surfaces 107, and the finishing roll 33 including the rounded nose surface 108, the angled groove-forming surfaces 109 and the shoulders 110. As before stated and as is the usual construction, the axes of the roughing and finishing rolls 32 and 33 are movable toward and away from the axes of the headstock and tailstock dies 29 and 30, with the roughing roll nose surface 105 being of larger diameter than the finishing roll nose surface 108, so that the roughing roll 32 is used first to form the rough groove in the particular pulley cup, and thereafter the finishing roll is used to form the finished or final groove therein.

In use of the apparatus illustrated in Figs. 4 and 5 and described above for forming the V-shaped groove 14 in the axially extending flange 12 of member 10, shown in Fig. 3, the headstock and tailstock dies 29 and 30 are first moved axially apart, and the pilot pin 65 is placed in extended position, that is, the position in relation to headstock die 29 illustrated in Fig. 4. This moves the supporting segments 64 of collapsible mandrel assembly 31 to their outer positions supported by the large diameter outer peripheral surface 87 of pilot pin 65, as shown in Fig. 4.

The cup-shaped member 10, shown in Fig. 3, is then telescoped over pilot pin 65, so that the hub 20 thereof surrounds a portion of the reduced diameter portion 90 and abuts against the inner end 71 of main supporting member 63. In this position, the axially extending flange 12 of cup-shaped member 10 overlies supporting segments 64 and is received in the recess formed by the recess 51a in the ring member 43 and the recess 61 in the ring member 53.

The V-shaped groove 14, as shown in Fig. 2, and Fig. 4, is then formed in the axially extending flange 12 of cup-shaped member 10 by the roughing roll 32 and finishing roll 33 in the usual method described in detail in the Nelson Patent No. 1,680,061, the Harrison patents, Nos. 1,828,464 and 2,062,415, and the Wickwire et al. Patent No. 2,685,856. Throughout the forming of the V-shaped groove 14 in the axially extending flange 12, the open end 15 of the flange 12 is confined against radial outward movement by the ring member 53 and the finishing roll shoulder 110 in the manner disclosed in the Wickwire et al. Patent No. 2,685,856.

During the forming of the V-shaped groove 14 in the axial flange 12 of cup-shaped member 10, the length of flange 12 is reduced and the headstock and tailstock dies 29 and 30 are moved closer together, moving the pilot pin 65 in a direction toward the headstock die 29, along with the collapsible mandrel 31, including the supporting segments 64. Thus, the supporting segments, at all times, support the inner side of the inwardly angled portion 16 of member 10, shown in Figs. 2 and 4, and the groove wall 13 of V-shaped groove 14 adjacent the segments, as also shown in Figs. 2 and 4. Groove-forming surface 50 on ring member 43 supports the other groove wall 13 of V-shaped groove 14, and groove 14 is formed between and against groove-forming surface 50 on ring member 43 and the support surfaces 79 on supporting segments 64, as shown in Fig. 4.

After the V-shaped groove 14 is formed in the axially extending flange 12 of the cup-shaped member 10, by roller forming or spinning the same therein, the pilot pin is moved axially in a direction toward the headstock die 29 or to the left, as viewed in Fig. 4. This axial movement of the pilot pin is continued until the outer conical end 92 thereof is withdrawn from beneath the supporting segments 64, thereby permitting the garter spring 82 to move these segments radially inwardly.

Spring 82 moves segments 64 radially inwardly until the lower ends of the guide portions 77 thereof are in abutting relation and until the arcuate outer surfaces 80 of these segments are substantially in axial alignment or radially inwardly of the outer peripheral surface 66 of outer ring member 62. This permits the lowermost portions of groove walls 13 forming the V-shaped groove 14 to be moved axially over the arcuate outer surfaces 80 of the segments 64, and upon separation of the headstock and tailstock dies 29 and 30 by moving the dies axially apart, the cup-shaped member 10 having the V-shaped groove 14 formed therein may be removed.

It should be understood that more than one V-shaped groove 14 may be formed in the axially extending flange 12 of cup-shaped member 10 by merely increasing the length of axial flange 12 and modifying the apparatus shown in Fig. 4. For instance, a series of parallel V-shaped grooves may be formed in the axially extending flange 12 according to the principles disclosed in the copending Killian et al. patent applications, Serial Nos. 488,870 and 497,880, without departing from the principles of the present invention, and it is not intended to limit the present invention to the particular embodiment shown.

To complete the assembly of the multi-groove pulley construction comprising the present invention, it is necessary to form the annular second member 11 of the configuration shown in Fig. 2, with the exception that preferably the vanes 27 forming the fan in the radial flange portion 26 are not formed, but rather this radial portion 26 is merely formed as a substantially straight radially outwardly extending portion, as shown in Fig. 6. That is to say, that the annular second member 11 is formed with the angled portion 22, the fastening portion 23 having the necked portion 24, and the outer flange portion 21 having the axially extending portion 25 and the radial portion 26 without the vanes 27. Member 11 is formed in this configuration by usual press operations.

Member 11 is then telescoped over hub 20 and positioned surrounding the cup-shaped member 10 in the position shown in Figs. 2 and 7. In such position, the fastening portion 23 and necked portion 24 of member 11 abut the fastening portion 18 and necked portion 19 of member 10, respectively, and are secured thereto by usual means such as brazing, as shown, spot welding or other usual fastening means.

The assembled multi-groove pulley construction is then ready to have a respinning operation performed thereon. This respinning operation is for the purpose of reforming both the V-shaped groove 14 formed in the cup-shaped member 10 and the V-shaped groove 17 formed by the combination of member 10 and the annular member 11, in order to form these grooves to be perfectly concentric with the axis of the multi-groove pulley and also to roller work-harden the wearing surfaces of the groove walls 13, 16 and 22.

Although this respinning operation is not necessary for many applications of use of the multi-groove pulley construction, there are many applications where it is highly desirable. Where the pulley construction is to be used at relatively high rotational speeds, the life of the multi-groove pulley comprising the present invention will be greatly increased by respinning the pulley to form concentric grooves having long wearing, roller work-hardened groove wall surfaces.

The respinning operation is performed on the apparatus illustrated in Fig. 7. As is shown, the apparatus of Fig. 7 is similar to the apparatus of Fig. 4, with the exception that the collapsible mandrel assembly, generally indicated at 31 in Fig. 4, is not required in the respinning operation and is therefore removed, and the roughing and finishing rolls 32 and 33 of the apparatus in Fig. 4 are replaced by a double finishing roll, generally indicated at 111 in Fig. 7.

Thus, the apparatus of Fig. 7 includes the headstock die main body portion 29a, the ring member 43, the ring member 53 and the tailstock die 30 having the insert 103. The outer ring member 62, main supporting member 63 and supporting segments 64 of the collapsible mandrel assembly 31 are removed from the apparatus shown in Fig. 4, and replaced by the hollow cylindrical member 112, as shown in Fig. 7.

Cylindrical member 112 is telescoped within the ring member 43, as shown, with this cylindrical member having a centrally located axially extending bore 113 formed therethrough in axial alignment with and of substantially the same size as the small diameter bore 35 of main body portion 29a. Further, the pilot pin 65 is also used in the apparatus for the respinning operation, however, in this operation, merely as a pilot pin to be received through hub 20 and into insert 103.

Still further, tailstock die 30 is slightly modified to conform to the configuration of the inwardly angled portion 22 of the annular second member 11. The angled inner end surface 99, shown in Fig. 4, is replaced by an angled end surface 117, as shown in Fig. 7, so that this surface in effect forms a groove-forming surface or a groove wall supporting surface during the respinning operation.

The double finishing roll, generally indicated at 111, is merely a roll having two spaced groove-forming contours formed thereon rather than the single groove-forming contour on the finishing roll 33 in Fig. 4. As shown in Fig. 7, roll 111 is provided with two sets of generally V-shaped groove-forming surfaces 114, a radiused connecting portion 115 and a shoulder 116 positioned outwardly of each of the sets of groove-forming surfaces 114.

The two sets of groove-forming surfaces 114 are spaced apart in accordance with the spacing of the V-shaped grooves 14 and 17 of the pulley construction. Further, the radiused connecting portion 115 substantially conforms to the contour of the portion of the pulley connecting groove walls 13 and 16.

The double finishing roll 111 is rotatably mounted with the axis thereof substantially parallel to the axis of the headstock and tailstock dies 29 and 30, so that with the headstock and tailstock dies 29 and 30 retaining the pulley construction therebetween and rotating the same, the axis of the finishing roll 111 may be moved toward the axis of the headstock and tailstock dies 29 and 30 until the finishing roll 111 is in the position shown in Fig. 7, that is, with the groove-forming surfaces 114 thereof engaged with and roller forming and ironing the groove walls 13, 16 and 22 of the pulley construction.

After the respinning operation is completed, the finishing roll 111 is moved away from the headstock and tailstock dies 29 and 30, the dies separated and the pulley removed. Thereafter, the vanes 27 may be formed in the radial portion 26 in the configuration shown in Figs. 1 and 2 by usual press means.

Summarizing the method of forming multi-groove pulleys comprising the present invention, the method includes the step of forming a cup-shaped first member 10 having a preferably uniform length annular axially extending flange 12 and an annular inwardly angled portion 16, preferably securing member 10 telescoped over a hub 20, preferably roller forming at least one V-shaped groove 14 in the axially extending flange portion 12 while preferably confining the open end 15 of flange portion 12 against radial outward movement and preferably supporting the inwardly angled portion 16, while groove 14 is being formed against annular groove-forming surfaces 50 and 79 on the headstock die 29 and supporting segments 64, respectively.

The method further includes forming an annular second member 11 having an inwardly angled portion 22 and preferably an outwardly extending flange portion 21, securing the second member 11 telescoped over the hub 20 and cup-shaped first member 10, with the inwardly angled portion 22 of the second member 11 and the inwardly angled portion 16 of the first member 10 forming the side walls of a V-shaped groove 17, preferably simultaneously roller ironing and reforming the V-shaped grooves 14 and 17, and preferably then forming a supplementary unit, such as the vanes 27 of a fan or a dust shield in the second member outwardly extending flange portion 21.

It should be understood that the vanes 27 could be formed in the annular second member 11 either prior to the respinning operation at the same time the remainder of member 11 is formed, or after the respinning operation, as described, and if such a respinning operation is included, and that the particular time when these vanes 27 are formed is merely a matter of choice. Further, as before pointed out, either the outer flange portion 21 of second member 11 may be eliminated altogether, or other configurations of supplementary units may be formed therein or attached thereto, with this again being merely a matter of choice and within the scope of the present invention.

It should be further understood that as hereinbefore pointed out, more than one V-shaped groove 14 may be formed in the axially extending flange 12 of the cup-shaped member 10, and that grooves 14 may be spaced from each other and may be spaced from groove 17 formed by the combination of members 10 and 11, any desired distance, with such being merely a matter of choice requiring slight modifications to the apparatus, and within the scope of the present invention. Finally, it should be understood, as hereinbefore pointed out, that in certain constructions within the scope of the present invention, the hub 20 may be eliminated and the fastening portions 18 and 23 of members 10 and 11 may be formed of different configuration, with bolt holes formed therethrough, or other means provided for mounting the pulleys on a supporting surface.

Thus, according to the principles of the present invention, a multi-groove pulley construction is provided in which at least one of the grooves has the walls thereof formed of two separate pieces, yet all of the groove walls have a high degree of concentricity and balance in the finished pulley; in which at least one of the grooves has the walls thereof formed of two pieces, yet all of the walls of all of the grooves may be provided with long wearing roller work-hardened surfaces; which is relatively light in weight and is satisfactory for high speed application; in which a supplementary unit such as a fan or dust shield may be formed as an integral part of one of the walls of one of the grooves; and which provides all of the above advantages, but yet may be manufactured with a minimum of operations and at a minimum of cost.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved construction and method illustrated and described herein are by way of example and the scope of the present invention is not limited to the exact details of construction and method shown and described.

Having now described the invention, the construction, the method, operation and use of preferred embodiments thereof, and the advantageous new and useful results obtained thereby, the new and useful construction and method and reasonable mechanical equivalents thereof obvious to those skilled in the art are set forth in the appended claims.

I claim:

1. A multi-groove pulley construction including a generally cup-shaped one piece first member having at least one V-groove formed in an annular axially extending flange thereof, a radially inwardly extending annular angled portion integrally connected to the flange and terminating radially inwardly in an integral fastening portion, said first member angled portion angling inwardly away from said first member one V-groove, a one piece second member having an annular angled portion formed thereon, the second member angled portion angling radially inwardly toward said first member one V-groove and terminating radially inwardly in an integral fastening portion, an integral radially outwardly extending flange portion connected to the second member angled portion, the second member radial flange portion having the vanes of a fan formed integrally therein, and the second member being telescoped over the first member with the fastening portions secured abutting and the angled portions forming a V-groove therebetween substantially parallel to said first member one groove.

2. A multi-groove pulley construction including a generally cup-shaped one piece first member having at least one V-groove formed in an annular axially extending flange thereof, a radially inwardly extending annular angled portion integrally connected to the flange and terminating radially inwardly in an integral fastening portion, said first member angled portion angling inwardly away from said first member one V-groove, the first member fastening portion telescoped over and secured to a hub, a one piece second member having an annular angled portion formed thereon, the second member angled portion angling radially inwardly toward said first member one V-groove and terminating radially inwardly in an integral fastening portion, an integral radially outwardly extending flange portion connected to the second member angled portion, the second member radial flange portion having the vanes of a fan formed integrally therein, the second member being telescoped over the first member with the fastening portions secured abutting and the angled portions forming a V-groove therebetween substantially parallel to said first member one groove, and the portions of the first and second members forming walls of the V-grooves being provided with roller work-hardened surfaces.

3. A multi-groove pulley construction including a generally cup-shaped one piece first member having at least one V-groove formed in an annular axially extending flange thereof, a radially inwardly extending annular angled portion integrally connected to the flange and terminating radially inwardly in an integral fastening portion, said first member angled portion angling inwardly away from said first member one V-groove, a one piece second member having an annular angled portion formed thereon, the second member angled portion angling radially inwardly toward said first member one V-groove and terminating radially inwardly in an integral fastening portion, the second member being telescoped with the first member with the fastening portions secured abutting and the angled portions forming a V-groove therebetween substantially parallel to said first member one groove, an integral flange portion formed on the second member extending radially outwardly from the second member angled portion, and a fan formed integral in the second member flange portion.

4. A multi-groove pulley construction including a generally cup-shaped one piece first member having at least one V-groove formed in an annular axially extending flange thereof, a radially inwardly extending annular angled portion integrally connected to the flange and terminating radially inwardly in an integral fastening portion, said first member angled portion angling inwardly away from said first member one V-groove, a one piece second member having an annular angled portion formed thereon, the second member angled portion angling radially inwardly toward said first member one V-groove and terminating radially inwardly in an integral fastening portion, the second member being telescoped with the first member with the fastening portions secured abutting and the angled portions forming a V-groove therebetween substantially parallel to said first member one groove, an integral flange portion formed on the second member extending radially outwardly from the second member angled portion, and an auxiliary unit formed integral in the second member flange portion.

5. A multi-groove pulley construction including a generally cup-shaped one piece first member having at least one V-groove formed in an annular axially extending flange thereof, a radially inwardly extending annular angled portion integrally connected to the flange and terminating radially inwardly in an integral fastening portion, said first member angled portion angling inwardly away from said first member one V-groove, a one piece second member having an annular angled portion formed thereon, the second member angled portion angling radially inwardly toward said first member one V-groove and terminating radially inwardly in an integral fastening portion, the second member being telescoped with the first member with the fastening portions secured abutting and the angled portions forming a V-groove therebetween substantially parallel to said first member one groove, and the first member one groove and the portions of the first and second members forming walls of the V-groove have roller work-hardened surfaces.

References Cited in the file of this patent

UNITED STATES PATENTS

| | | |
|---|---|---|
| 1,700,416 | Nelson | Jan. 29, 1929 |
| 1,711,254 | Spreen | Apr. 30, 1929 |
| 1,724,604 | Lambert | Aug. 13, 1929 |
| 1,728,002 | Nelson | Sept. 10, 1929 |
| 1,828,464 | Harrison | Oct. 20, 1931 |
| 2,646,689 | Maher | July 28, 1953 |
| 2,696,740 | Zatko | Dec. 14, 1954 |
| 2,736,956 | Stahl et al. | Mar. 6, 1956 |
| 2,741,134 | Bagley | Apr. 10, 1956 |
| 2,808,642 | Fons et al. | Oct. 8, 1957 |

FOREIGN PATENTS

| | | |
|---|---|---|
| 6,161 | Great Britain | of 1892 |
| 269,297 | Great Britain | Apr. 21, 1927 |
| 625,768 | Great Britain | July 4, 1949 |
| 1,074,499 | France | Mar. 31, 1954 |